United States Patent [19]

Fujiwara et al.

[11] Patent Number: 4,579,309
[45] Date of Patent: Apr. 1, 1986

[54] ATTACHMENT FOR A RESINOUS RESERVOIR

[75] Inventors: Hidetoshi Fujiwara; Tetsushi Kawamura, both of Okazaki, Japan

[73] Assignees: Toyoda Koki Kabushiki Kaisha, Kariya; Toyota Jidosha Kabushiki Kaisha, Toyota, both of Japan

[21] Appl. No.: 618,735

[22] Filed: Jun. 8, 1984

[30] Foreign Application Priority Data

Jun. 10, 1983 [JP] Japan ............... 58-89594[U]

[51] Int. Cl.⁴ .................................. A47K 1/08
[52] U.S. Cl. ......................... 248/311.2; 248/221.3
[58] Field of Search ............... 248/311.2, 221.3, 73, 248/313; 222/180, 181

[56] References Cited

U.S. PATENT DOCUMENTS

| | | | |
|---|---|---|---|
| 1,165,840 | 12/1915 | Brutus | 248/313 |
| 1,228,098 | 5/1917 | Cole | 248/311.2 X |
| 1,634,953 | 7/1927 | McCune et al. | 248/313 X |
| 1,794,700 | 3/1931 | McCaskey | 248/221.3 |
| 1,894,146 | 1/1933 | Baker | 248/311.2 X |
| 1,967,112 | 7/1934 | Bradley | 248/313 |
| 2,939,613 | 6/1960 | Herman et al. | 222/181 |
| 3,533,526 | 10/1970 | Adell | 248/313 X |
| 4,366,922 | 1/1983 | Levine et al. | 248/221.3 X |

FOREIGN PATENT DOCUMENTS 55-41548  3/1980  Japan .

Primary Examiner—Ramon S. Britts
Assistant Examiner—David M. Purol
Attorney, Agent, or Firm—Oblon, Fisher, Spivak, McClelland & Maier

[57] ABSTRACT

An attachment for a synthetic resinous reservoir as used in an automotive power steering system is provided with a steel bracket having a vertically extending dovetail slot whose horizontal width is narrowed as the height of the same decreases. The synthetic resinous reservoir has protruded from its side surface a vertically extending dovetail portion whose horizontal width is likewise narrowed as the height of the same decreases for close fitting in the dovetail slot. The dovetail portion presents at a part thereof a horizontal surface portion, which is in abuttable engagement with an upper end of a holding member bodily formed on the bracket, so that the reservoir can be prevented from generating chatter relative to the bracket.

2 Claims, 5 Drawing Figures

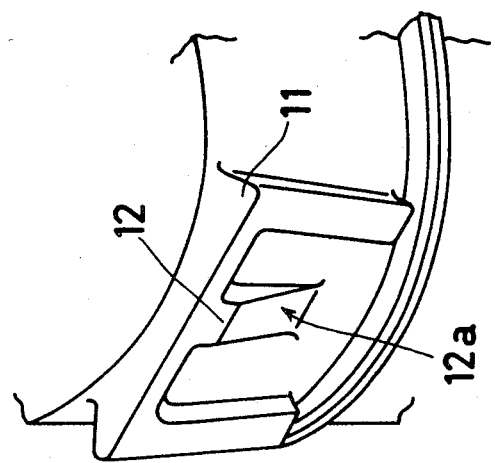
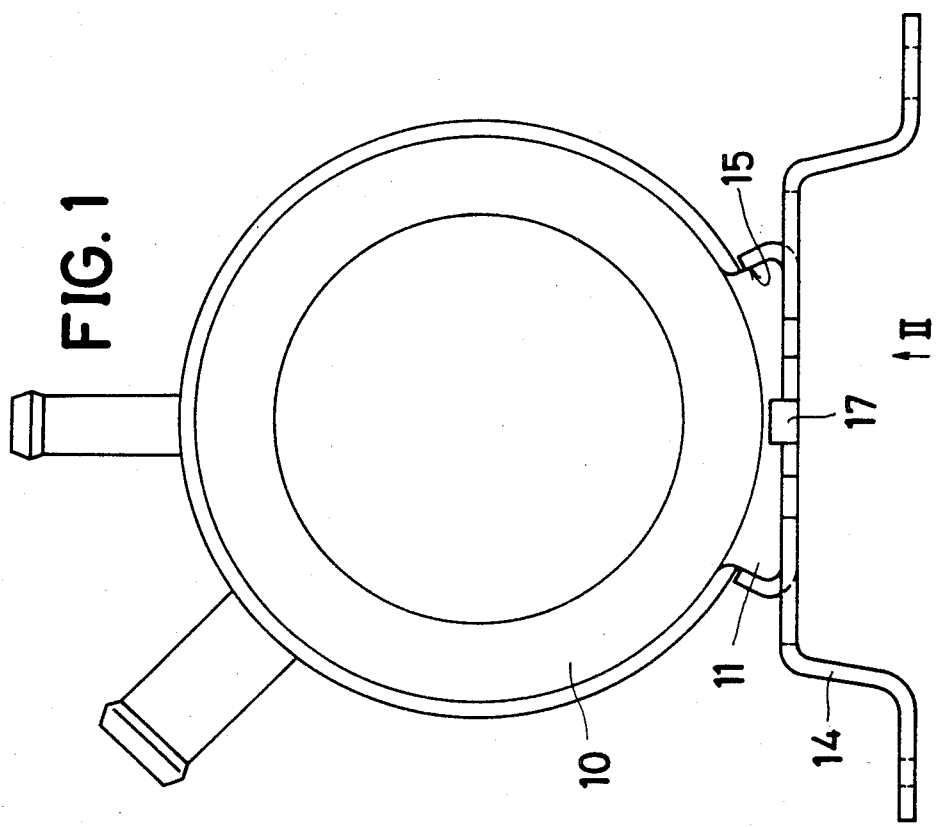

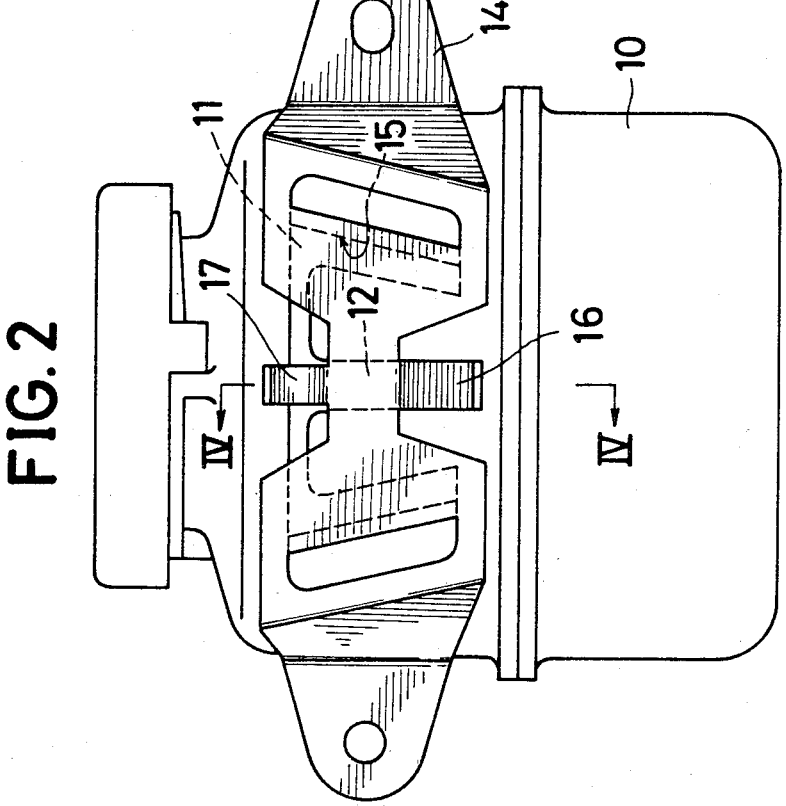
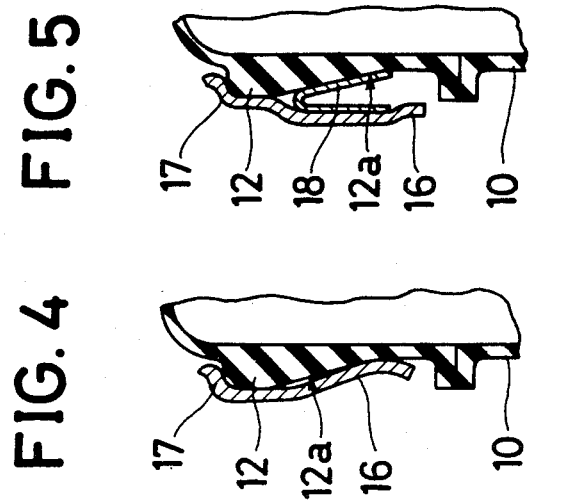

ATTACHMENT FOR A RESINOUS RESERVOIR

BACKGROUND OF THE INVENTION

1. Field of the Invention

The present invention relates to an attachment used in attaching a resinous reservoir to a fixed part such as, for example, the body of a motor vehicle.

2. Discussion of the Background

Resently, it has become common to make oil reservoirs used in power steering systems of motor vehicles, of a synthetic resin for light weight and high productivity. Such resinous reservoirs are usually mounted in a motor vehicle engine room by the use of a reservoir attachment with a screw-fastened steel band. Further, an improved reservoir attachment has been proposed for easier mounting of a resinous reservoir. This attachment is composed of a mounting bracket, which supports the reservoir, with an upper engaging edge and opposite side engaging edges thereof being respectively fitted in an upper guide slot and opposite side guide slots formed on one lateral surface of the reservoir. The attachment also utilizes a protrusion-groove engagement so that the reservoir can be prevented from being upwardly removed from the bracket.

However, since a large change in dimensions of such a resinous reservoir takes place depending upon the environmental temperature changing, a relatively large clearance, may be made at each edge-slot engaging portion as well as the protrusion-groove engaging portion, and this results in chatter being generated by the reservoir.

SUMMARY OF THE INVENTION

Accordingly, it is a primary object of the present invention to provide an improved attachment for a resinous reservoir capable of not only making the mounting of the reservoir easy, but also preventing chatter being generated from the reservoir relative to a mounting bracket therefor.

Another object of the present invention is to provide an improved attachment of the character set forth above wherein any clearance which may occur at each engaging portion between a mounting bracket and a resinous reservoir can be absorbed, thereby being reliable in operation notwithstanding that a relatively large change in the dimension of the reservoir takes place due to a temperature change or during the course of a span of time.

Briefly, according to the present invention, there is provided an attachment which comprises a mounting bracket for mounting a resinous reservoir thereon. The reservoir is formed with a vertically extending dovetail portion whose horizontal width is narrowed as the height position decreases. The bracket is formed with a vertically extending dovetail slot whose horizontal width is likewise narrowed as the height position decreases down, for permitting the dovetail portion to be closely fitted therein. The dovetail portion is also formed with a horizontal surface portion, with which a holding member formed bodily on the bracket is in abuttable engagement for preventing the dovetail portion from being upwardly removed from the dovetail slot.

With this configuration, since both the dovetail portion and the slot is narrowed in a downward direction, the engagement of the holding member with the horizontal surface portion so as maintains the dovetail portion to be closely fitted in the dovetail slot, whereby the reservoir can be prevented from generating chatter to the bracket.

BRIEF DESCRIPTION OF THE DRAWINGS

These and other objects, features and many of the attendant advantages of the present invention will be readily appreciated as the same becomes better understood by reference to the following detailed description of the preferred embodiments when considered in connection with the accompanying drawings, wherein like reference numerals designate identical or corresponding parts throughout the several views, and in which:

FIG. 1 is a plan view of a resinous reservoir attachment according to the present invention;

FIG. 2 is an elevational view of the attachment, as viewed from a direction indicated by the arrow II in FIG. 1;

FIG. 3 is a perspective view of a dovetail portion formed on a reservoir shown in FIGS. 1 and 2;

FIG. 4 is a fragmentary sectional view of the attachment taken along the line IV—IV in FIG. 2; and FIG. 5 is a fragmentary sectional view corresponding to FIG. 4, of another embodiment according to the present invention.

DESCRIPTION OF THE PREFERRED EMBODIMENTS

Referring now to the drawings and more particularly to FIGS. 1 and 2 thereof, reference numeral 10 denotes a synthetic resinous reservoir for containing oil therein. The reservoir 10 is formed with a vertically extending dovetail portion 11 whose width in a horizontal direction is narrowed as the height position comes down. The dovetail portion 11 has at its mid portion a vertically extending rib 12 (see FIGS. 3 and 4), which is slanted toward the center axis of the reservoir 10 as its height position comes down. On the other hand, a mounting bracket 14 made of steel is formed with a vertically extending dovetail slot 15. The width of this dovetail slot 15 in a horizontal direction is narrowed as its height decreases, for permitting the dovetail portion 11 to be closely fitted therein. Further, the bracket 14 is bodily formed with a holding piece 16, whose lower portion is in abutting engagement with a slanted surface portion 12a of the reservoir rib 12. A stop portion 17 is further formed at the upper end of the holding piece 16, as best shown in FIG. 4. This stop portion 17 is in abutting engagement with the top surface of the reservoir rib 12 so that the dovetail portion 11 can be prevented from being upwardly removed from the dovetail slot 15.

When an environmental temperature drop causes the resinous reservoir 10 to be contracted, a relatively large clearance may be created between the dovetail portion 11 and the dovetail slot 15. However, such a clearance can be eliminated through the downward movement of the dovetail portion 11 into the dovetail slot 15, whereby chatter generated between the reservoir 10 and the bracket 14 can be reliably prevented. In order to cause the downward movement of the dovetail portion 11, the stop portion 17 of the holding piece 16 is bent to the extent that it applies an urging force to the top surface of the rib 12 at a room temperature. Likewise, the lower portion of the holding piece 16 is bent to the extent that it applies an urging force to the slanted surface 12a of the rib 12, so that the reservoir can be prevented from generating chatter relative to the bracket 14 in a horizontal direction (i.e., in a radial direction of the reservoir 10).

FIG. 5 shows a part of a second embodiment of an reservoir attachment according to the present invention. In this embodiment, a V-shaped leaf spring 18 is interposed between the slanted surface 12a of the reservoir rib 12 and the holding piece 16 which is bodily formed on the bracket 14, so as to positively provide a tension between the reservoir 10 and the bracket 14.

Obviously, numerous modification and variations of the present invention are possible in light of the above teachings. It is therefore to be understood that within the scope of the appended claims, the present invention may be practiced otherwise than as specifically descired herein.

What is claimed as new and desired to be secured by Letters Patent of the United States is:

1. A resinous reservoir and attachment, comprising:
   a vertically extending dovetail portion integrally formed on a lateral surface of said resinous reservoir and having a horizontal width portion which is narrowed as the height thereof decreases;
   a mounting bracket;
   means formed on said mounting bracket for defining a vertically extending dovetail slot whose horizontal width is narrowed as the height thereof decreases so as to permit said dovetail portion to be closely fitted therein;
   means for preventing said dovetail portion from being upwardly removed from said dovetail slot;
   a vertically extending rib integrally formed with and centrally disposed on said dovetail portion and defining said horizontal width portion at an upper end thereof, said rib also defining at a side portion thereof a radially inwardly slanted surface portion defining an undercut lower end thereon; and
   said holding member overlying said horizontal width portion at an upper end thereof for preventing said dovetail portion from being upwardly removed from said dovetail slot and including a lower holding piece securely engaging said slanted surface portion at a lower portion thereof for preventing said reservoir from horizontally moving to and away from said bracket.

2. A resinous reservoir and attachment, comprising:
   a vertically extending dovetail portion integrally formed on a lateral surface of said resinous reservoir and having a horizontal width portion which is narrowed as the height thereof decreases;
   a mounting bracket;
   means formed on said mounting bracket for defining a vertically extending dovetail slot whose horizontal width is narrowed as the height thereof decreases so as to permit said dovetail portion to be closely fitted therein;
   means for preventing said dovetail portion from being upwardly removed from said dovetail slot; and
   a vertically extending rib integrally formed at said dovetail portion and defining said horizontal width portion at an upper end thereof, said rib also defining at a side portion thereof a slanted surface portion having a lower end; and
   a spring interposed between a lower portion of said holding member and said slanted surface portion for urging said reservoir horizontally away from said bracket;
   an upper end of said holding member being engaged with said horizontal width portion for preventing said dovetail portion from being upwardly removed from said dovetail slot.

* * * * *